(12) United States Patent
Matsunaga

(10) Patent No.: US 10,302,918 B2
(45) Date of Patent: May 28, 2019

(54) IMAGING LENS AND IMAGING UNIT

(71) Applicant: SONY CORPORATION, Tokyo (JP)

(72) Inventor: Shigehiko Matsunaga, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/547,409

(22) PCT Filed: Jan. 25, 2016

(86) PCT No.: PCT/JP2016/051986
§ 371 (c)(1),
(2) Date: Jul. 28, 2017

(87) PCT Pub. No.: WO2016/125613
PCT Pub. Date: Aug. 11, 2016

(65) Prior Publication Data
US 2018/0024331 A1 Jan. 25, 2018

(30) Foreign Application Priority Data
Feb. 6, 2015 (JP) ................. 2015-021994

(51) Int. Cl.
G02B 3/02 (2006.01)
G02B 13/06 (2006.01)
G02B 13/04 (2006.01)
G02B 9/62 (2006.01)
H04N 5/225 (2006.01)
H04N 5/232 (2006.01)
(Continued)

(52) U.S. Cl.
CPC .............. *G02B 13/06* (2013.01); *G02B 9/62* (2013.01); *G02B 13/04* (2013.01); *H04N 5/2254* (2013.01); *H04N 5/23238* (2013.01); *G02B 7/028* (2013.01); *G02B 13/0045* (2013.01)

(58) Field of Classification Search
CPC ...................................................... G02B 13/06
USPC ......................................................... 359/713
See application file for complete search history.

(56) References Cited

U.S. PATENT DOCUMENTS 5,666,228 A * 9/1997 Yamamoto ............. G02B 13/18
359/651
2001/0013980 A1 8/2001 Kohno et al.
(Continued)

FOREIGN PATENT DOCUMENTS

EP 1 382 985 A2 1/2004
JP 9-311273 A 12/1997
(Continued)

OTHER PUBLICATIONS

International Search Report dated Apr. 19, 2016 in PCT/JP2016/051986 filed Jan. 25, 2016.
(Continued)

Primary Examiner — James C. Jones
(74) Attorney, Agent, or Firm — Xsensus LLP

(57) ABSTRACT

An imaging lens according to the disclosure includes a negative front group, a stop, and a positive rear group. The front group includes a negative first lens having a meniscus shape with a convex surface facing the object side, a negative second lens having the meniscus shape with a convex surface facing the object side, and a positive third lens having a biconvex shape. The rear group includes a positive fourth lens, a negative fifth lens with a concave surface facing the image side, and a positive sixth lens.

14 Claims, 7 Drawing Sheets

EXAMPLE 1

(51) Int. Cl.
   *G02B 13/00* (2006.01)
   *G02B 7/02* (2006.01)

(56) References Cited

U.S. PATENT DOCUMENTS

| | | |
|---|---|---|
| 2012/0026285 A1 | 2/2012 | Yoshida et al. |
| 2012/0081799 A1* | 4/2012 | Tseng .................. G02B 13/18 359/713 |
| 2014/0198395 A1* | 7/2014 | Ryu .................. G02B 13/0045 359/713 |

FOREIGN PATENT DOCUMENTS

| | | |
|---|---|---|
| JP | 2000-187157 A | 7/2000 |
| JP | 2009-92798 A | 4/2009 |
| JP | 2013-3545 A | 1/2013 |
| JP | 2013-73155 A | 4/2013 |
| JP | 2013-73168 A | 4/2013 |
| JP | 2014-89348 A | 5/2014 |
| JP | 2014-197131 A | 10/2014 |

OTHER PUBLICATIONS

European Search Report dated Aug. 28, 2018, issued in European Patent Application No. 16746444.5.

* cited by examiner

[ FIG. 1 ]
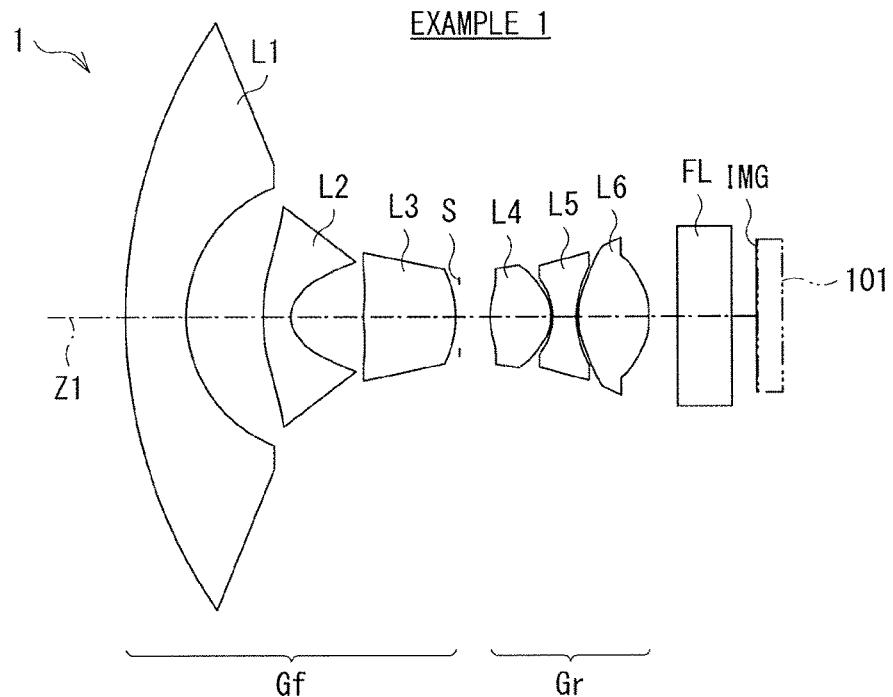
[ FIG. 2 ]
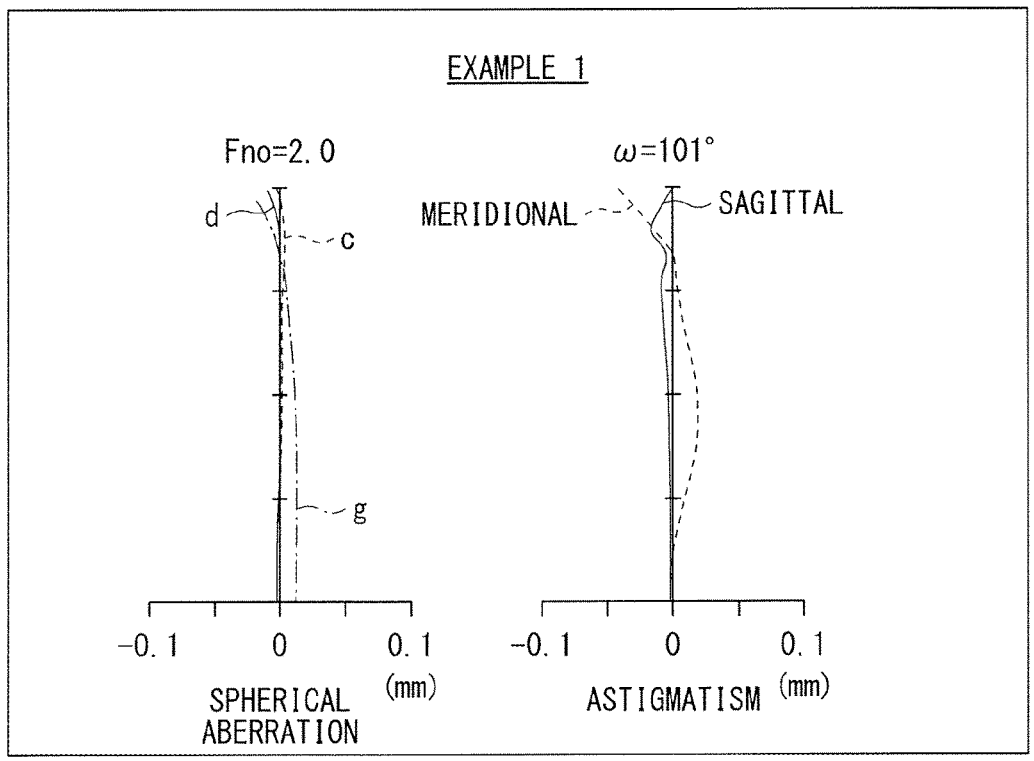

[FIG. 3]
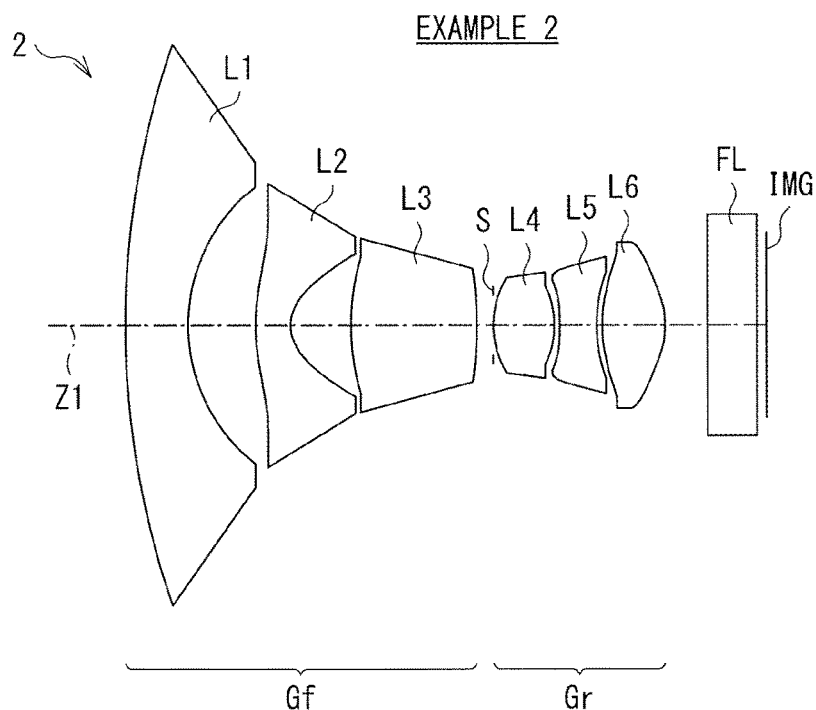
[FIG. 4]
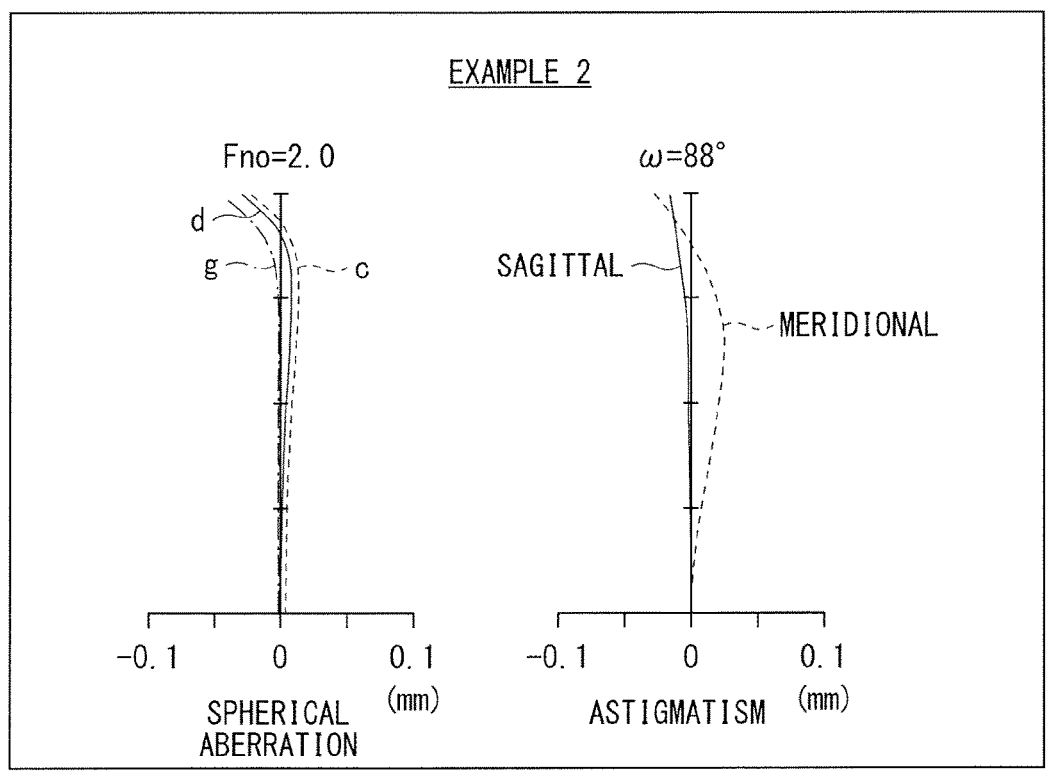

[ FIG. 5 ]
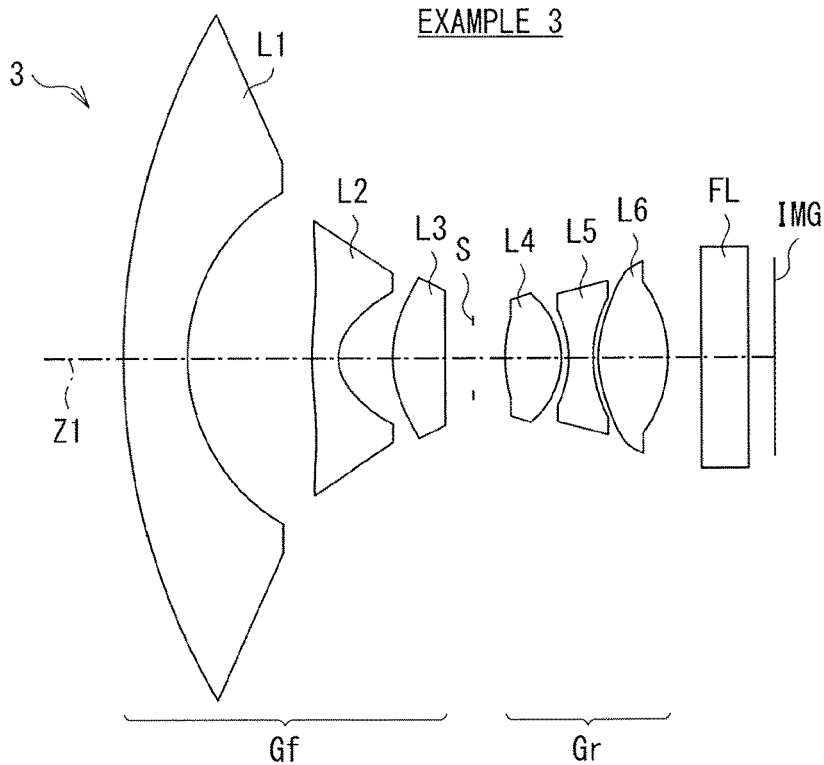
[ FIG. 6 ]
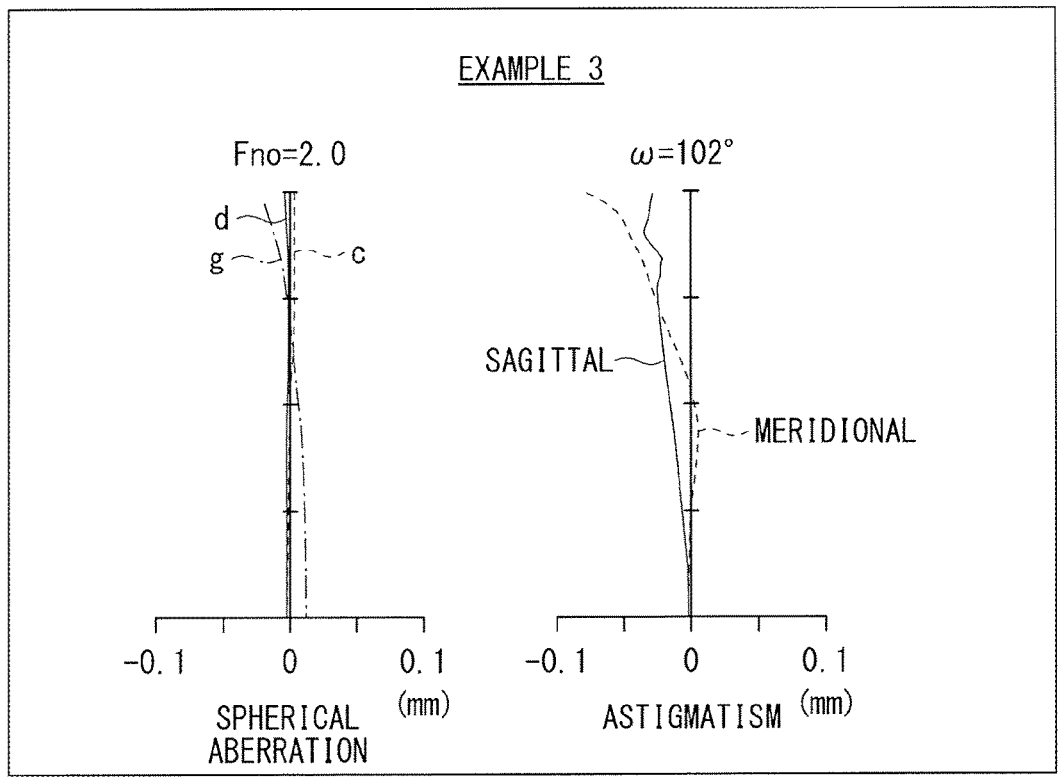

[ FIG. 7 ]
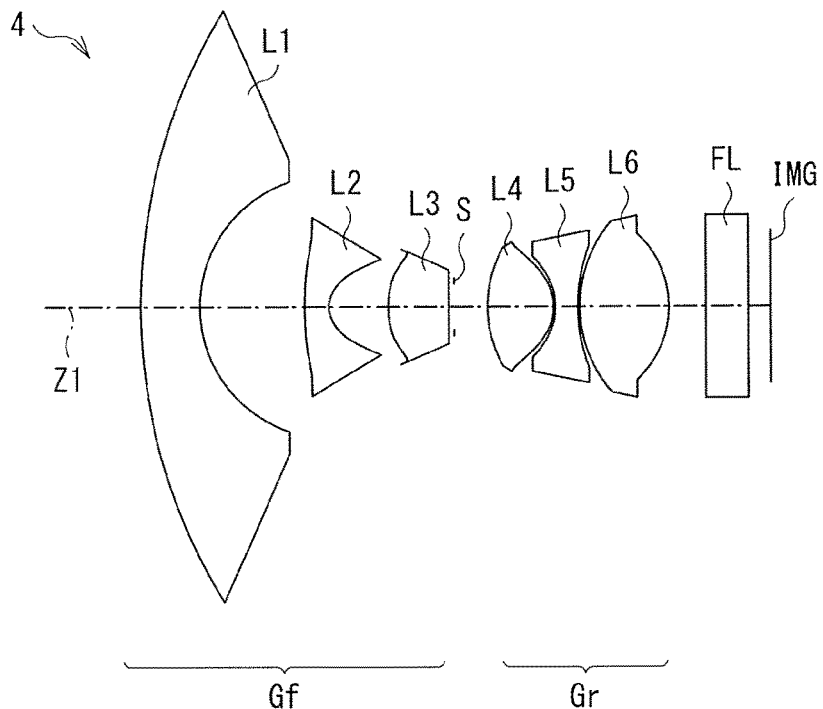
[ FIG. 8 ]
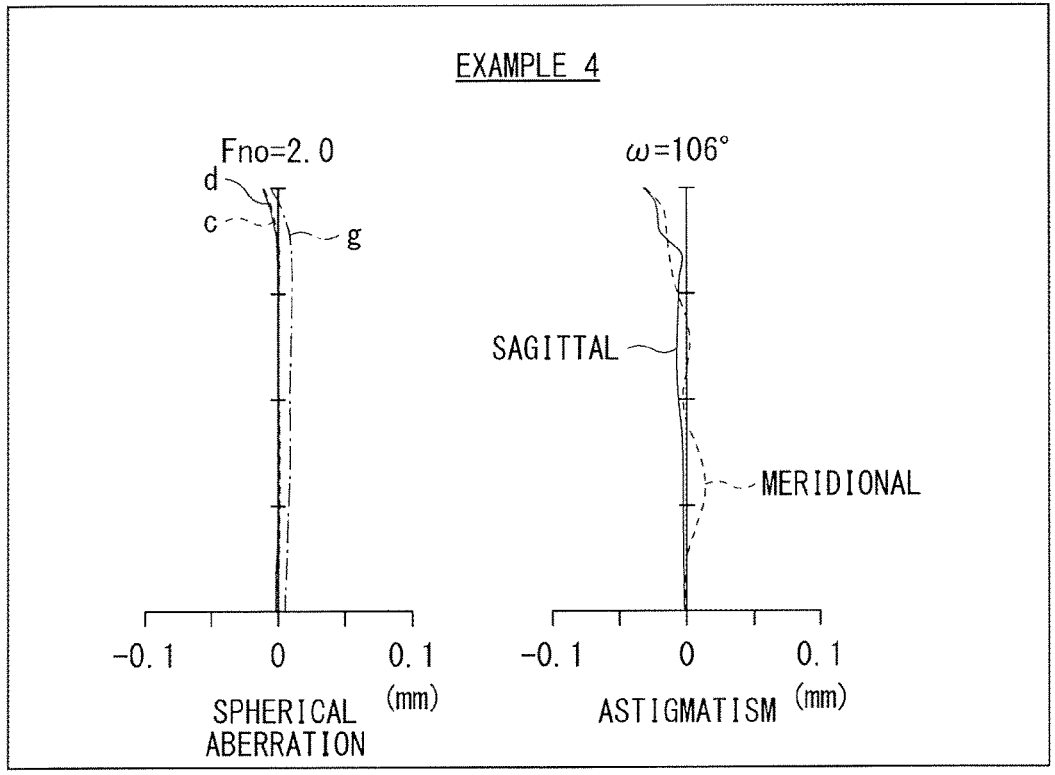

[ FIG. 9 ]
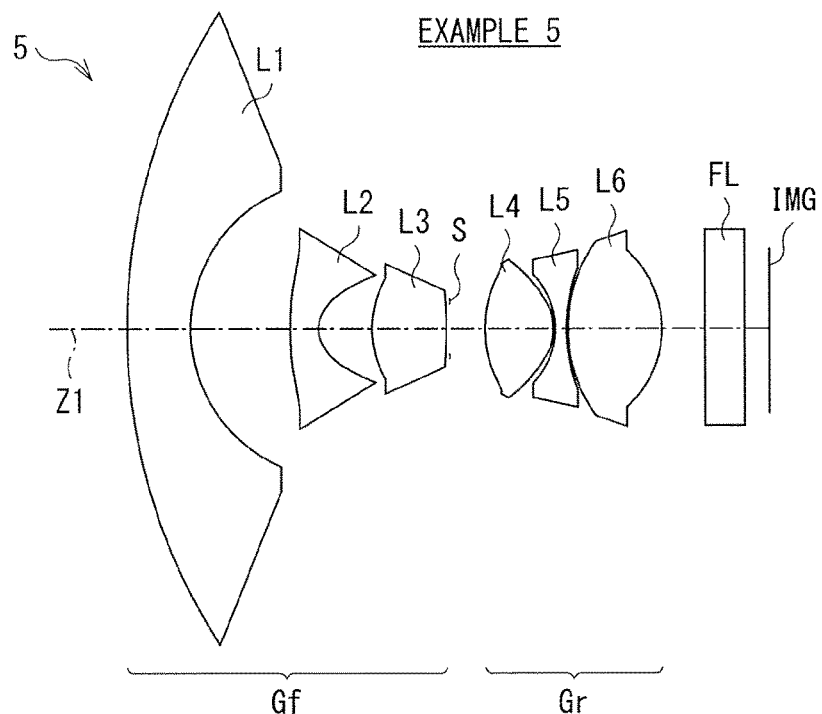
[ FIG. 10 ]
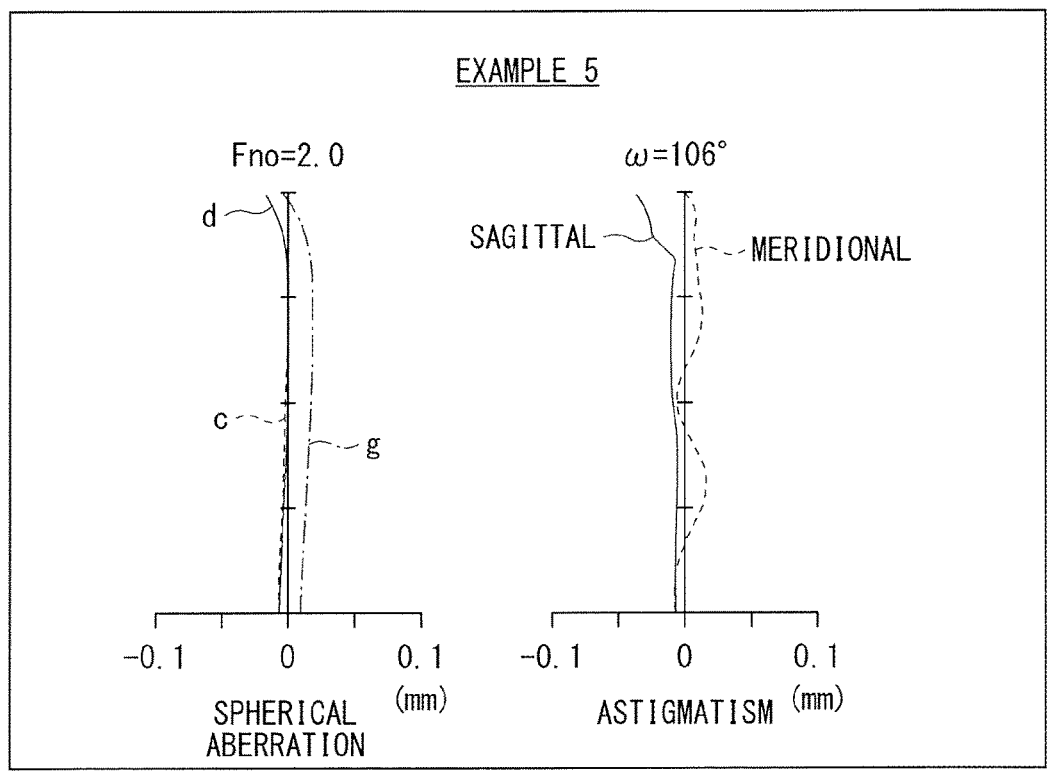

[ FIG. 11 ]
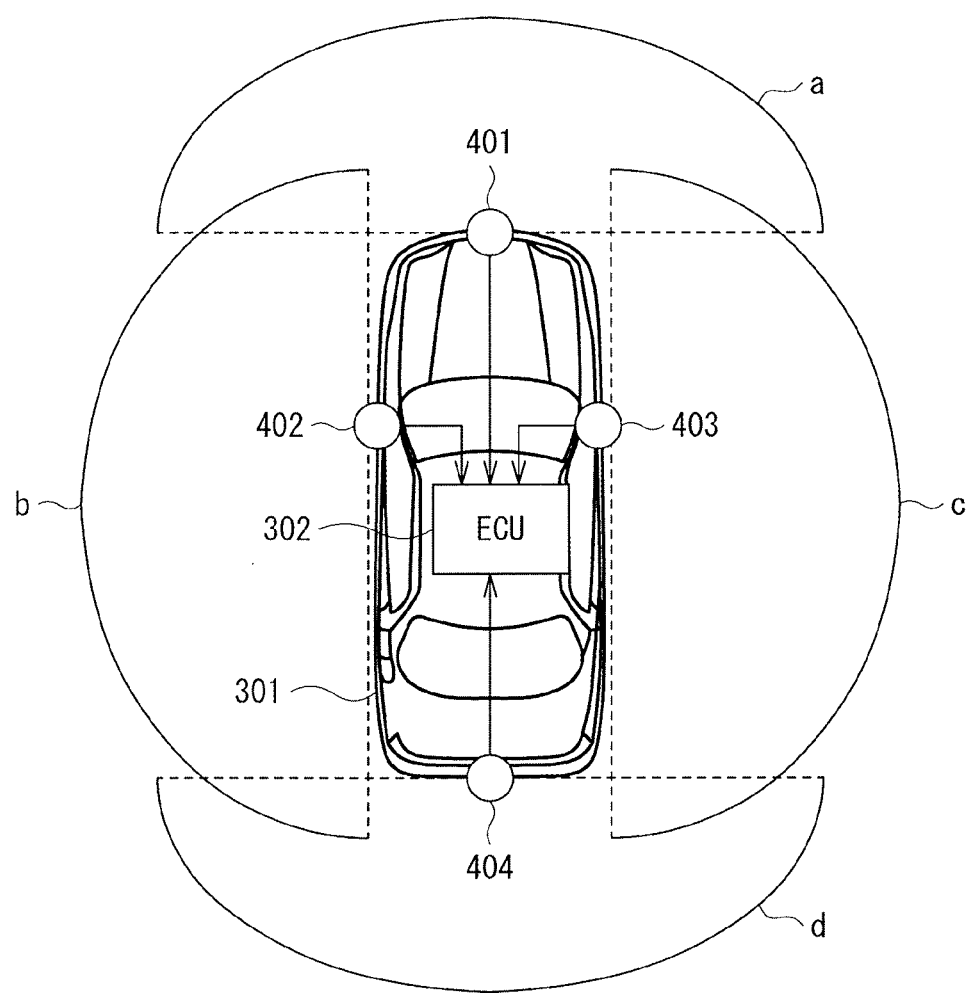

[ FIG. 12 ]
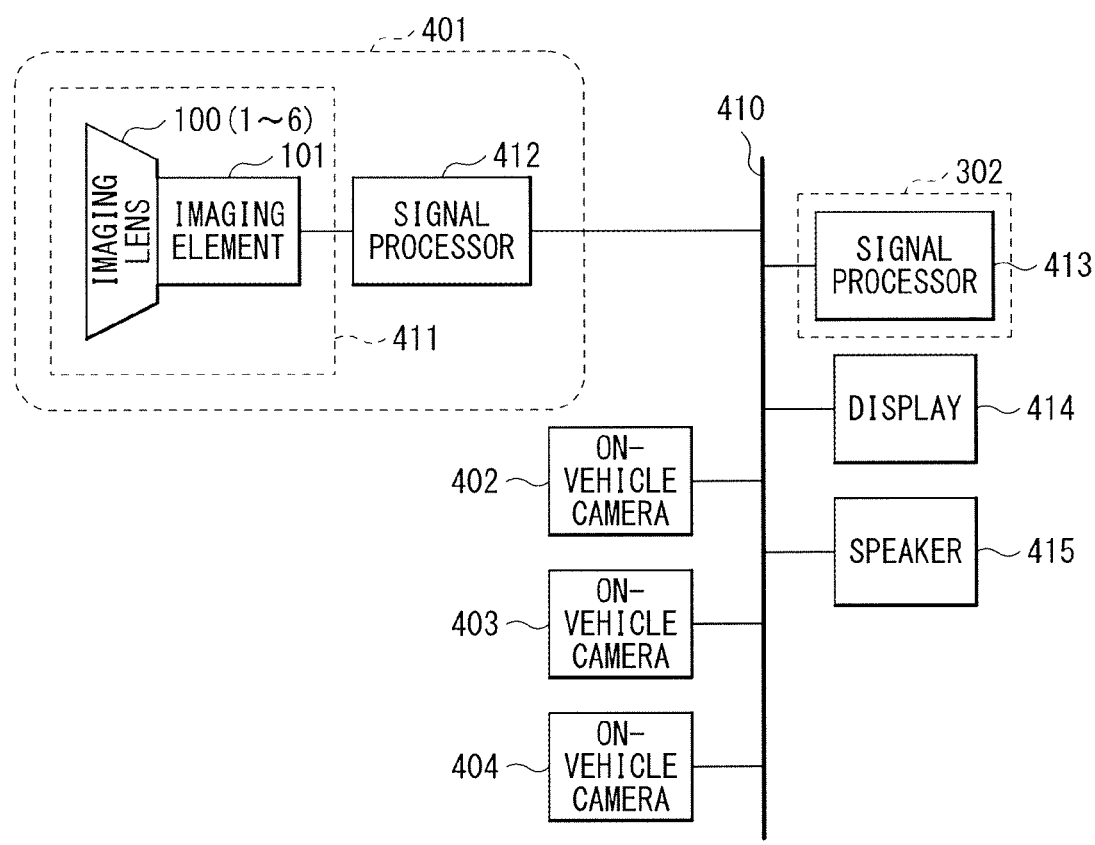

IMAGING LENS AND IMAGING UNIT

TECHNICAL FIELD

The disclosure relates to an imaging lens and an imaging unit that are suitable for, for example, on-vehicle cameras, monitoring cameras, and cameras for mobile devices.

BACKGROUND ART

In recent years, imaging units such as on-vehicle cameras, monitoring cameras, and cameras for mobile devices have been widely spreading. These imaging units are requested to ensure a wide field angle, while achieving satisfactory resolution performance of the surroundings, with a small size and at low costs. Examples of wide-angle imaging lenses that satisfy such requests include those as described in the following PTLs 1 to 3.

CITATION LIST

Patent Literature

PTL 1: Japanese Unexamined Patent Application Publication No. 2013-3545
PTL 2: Japanese Unexamined Patent Application Publication No. 2014-197131
PTL 3: Japanese Unexamined Patent Application Publication No. 2014-89349

SUMMARY OF THE INVENTION

PTL 1 makes a proposal for a wide-angle imaging lens constituted by five lenses in five groups. However, although the imaging lens described in PTL 1 achieves a field angle larger than 180° as an entire field angle, a rear group rearward of a stop has a two-lens configuration including a positive lens and a negative lens. Accordingly, the imaging lens fails in fully correcting a chromatic aberration. It is difficult to obtain the satisfactory resolution performance over the surroundings.

PTL 2 makes a proposal for a wide-angle imaging lens constituted by six lenses in five groups. The wide-angle imaging lens described in PTL 2 attains a photographing field angle of 150° or more. But the wide-angle imaging lens is constituted solely by glass lenses, and also includes a cemented lens. This contributes to advantages in terms of the chromatic aberration or sensitivity, but involves using a cementing agent or performing processing. It is therefore difficult to reduce costs. Moreover, in particular, regarding the on-vehicle cameras, in recent years, there has been rapid advancement in attempts to perform automatic operation such as a parking assistance function by white line recognition, as applications of automatic recognition techniques to the imaging units. Such cameras are requested not to suffer from changes in optical characteristics of the cameras even if temperature changes occur in tough environment where a vehicle travels. Plastic lenses allow for lower costs and smaller weight as compared to glass lenses. But the plastic lenses are subjected to significant changes in the active indexes in accordance with temperature changes. Moreover, expansion and subtraction because of large linear expansion coefficients cause changes in surface shapes, contributing to degradation in the optical characteristics. Therefore, imaging lenses constituted solely by the glass lenses have been mainly utilized so far, for the imaging lenses for the above-described applications.

PTL 3 makes a proposal for a configuration including six lenses in four groups, with a third lens group being a cemented lens of glass lenses, to restrain the changes in the optical characteristics accompanying the temperature changes. However, the configuration utilizes three glass lenses out of the six lenses. Furthermore, because the third lens group is the cemented lens of the two glass lenses, it is necessary to use the cementing agent or to perform the processing for cementing. It is therefore difficult to reduce costs. Moreover, with the cemented lens of the two plastic lenses included, there is a concern that a shape of a cemented surface changes in accordance with the temperature change, causing a cemented joint to peel off easily. Furthermore, the plastic lenses are disposed near an imaging element that serves as a source of heat generation. This makes the configurators more likely to be affected by the temperature changes.

Accordingly, there has been a desire for development of a single-focus wide-angle imaging lens that balances size reduction and a wide field angle, e.g., the photographing angle of 150° or more, and restrains changes in the optical characteristics due to the temperature changes at low costs.

It is therefore desirable to provide an imaging lens that makes it possible to achieve size reduction and cost reduction while providing a wide field angle and high image quality, and an imaging unit. Moreover, it is desirable to provide an imaging lens that makes it possible to restrain changes in optical characteristics due to temperature changes at low costs, and an imaging unit.

An imaging lens according to an embodiment of the disclosure includes a negative front group, a stop, and a positive rear group, in the order from object side toward image side. The front group includes a negative first lens having a meniscus shape with a convex surface facing the object side, a negative second lens having the meniscus shape with a convex surface facing the object side, and a positive third lens having a biconvex shape. The rear group includes a positive fourth lens, a negative fifth lens with a concave surface facing the image side, and a positive sixth lens.

An imaging trait according to an embodiment of the disclosure includes an imaging lens and an imaging element that outputs an imaging signal that corresponds to an optical image formed by the imaging lens. The imaging lens includes a negative front group, a stop, and a positive rear group, in the order from object side toward image side. The front group includes a negative first lens having a meniscus shape with a convex surface facing the object side, a negative second lens having the meniscus shape with a convex surface facing the object side, and a positive third lens having a biconvex shape. The rear group includes a positive fourth lens, a negative fifth lens with a concave surface facing the image side, and a positive sixth lens.

In the imaging lens or the imaging unit according to the embodiments of the disclosure, with a six-lens configuration as a whole, optimization of a configuration of each lens is attained, mainly by lens shapes and power distribution.

Another imaging lens according to an embodiment of the disclosure includes a negative front group, a stop, and a positive rear group, in the order from object side toward image side. The front group includes a negative first lens, a negative second lens, and a positive third lens. The rear group includes a positive fourth lens, a negative fifth lens, and a positive sixth lens. The first lens and the sixth lens are made of glass. The imaging lens satisfies the following condition, $$20 < |fp| \tag{5}$$

in which fp is a composite focal length of the second to the fifth lenses.

Another imaging unit according to an embodiment of the disclosure includes an imaging lens and an imaging element that outputs an imaging signal that corresponds to an optical image formed by the imaging lens. The imaging lens includes a negative front group, a stop, and a positive rear group, in the order from object side toward image side. The front group includes a negative first lens, a negative second lens, and a positive third lens. The rear group includes a positive fourth lens, a negative fifth lens, and a positive sixth lens. The first lens and the sixth lens are made of glass. The imaging lens satisfies the following condition, $$20<|fp| \qquad (5)$$

in which fp is a composite local length of the second to the fifth lenses.

In the other imaging lens or the other imaging unit according to the embodiments of the disclosure, with a six-lens configuration as a whole, optimization of a configuration of each lens is attained, mainly by lens materials and power distribution.

According to the imaging lens or the imaging unit of the embodiments of the disclosure, with the six-lens configuration as a whole, the optimization of the configuration of each lens is attained, mainly by the lens shapes and the power distribution. Hence, it is possible to achieve the size reduction and the cost reduction while providing the wide field angle and the high image quality.

According to the other imaging lens or the imaging unit of the embodiments of the disclosure, with the six-lens configuration as a whole, the optimization of the configuration of each lens is attained, mainly by the lens materials and the power distribution. Hence, it is possible to restrain the changes in the optical characteristics due to the temperature changes at the low costs.

It is to be noted that effects of the disclosure are not necessarily limited to the effects described above, and may include any of effects that are described herein.

BRIEF DESCRIPTION OF DRAWING

FIG. 1 is a lens cross-sectional view of a first configuration example of an imaging lens according to one embodiment of the disclosure.

FIG. 2 is an aberration diagram that illustrates various aberrations in Numerical Example 1 in which specific numerical values are applied to the imaging lens illustrated in FIG. 1.

FIG. 3 is a lens cross-sectional view of a second configuration example of an imaging lens.

FIG. 4 is an aberration diagram that illustrates various aberrations in numerical Example 2 in which specific numerical values are applied, to the imaging lens illustrated in FIG. 3.

FIG. 5 is a lens cross-sectional view of a third configuration example of an imaging lens.

FIG. 6 is an aberration diagram that illustrates various aberrations in Numerical Example 3 in which specific numerical values are applied to the imaging lens illustrated in FIG. 5.

FIG. 7 is a lens cross-sectional view of a fourth configuration example of an imaging lens.

FIG. 8 is an aberration diagram that illustrates various aberrations in Numerical Example 4 in which specific numerical values are applied to the imaging lens illustrated in FIG. 7.

FIG. 9 is a lens cross-sectional view of a fifth configuration example of an imaging lens.

FIG. 10 is an aberration diagram that illustrates various aberrations in Numerical Example 5 in which specific numerical values are applied to the imaging lens illustrated in FIG. 9.

FIG. 11 is a descriptive diagram that illustrates one example of exemplary disposition of on-vehicle cameras.

FIG. 12 is a block diagram that illustrates one network configuration example of fee on-vehicle cameras.

MODES FOR CARRYING OUT THE INVENTION

In the following, some embodiments of the disclosure are described in detail with reference to the drawings it is to be noted that description is made in the following order.
1. Basic Configuration of Lens
2. Workings and Effects
3. Application Example to Imaging Unit
4. Numerical Examples of Lens
5. Other Embodiments

[1. Basic Configuration of Lens]

FIG. 1 illustrates a cross-sectional configuration of an imaging lens 1 according to a first configuration example of one embodiment of the disclosure. FIG 3 illustrates a cross-sectional configuration of an imaging lens 2 according to a second configuration example. FIG. 5 illustrates a cross-sectional configuration of an imaging lens 3 according to a third configuration example. FIG. 7 illustrates a cross-sectional configuration of an imaging lens 4 according to a fourth configuration example. FIG. 3 illustrates a cross-sectional configuration of an imaging lens 5 according to a fifth configuration example. Described later are Numerical Examples in which specific numerical values are applied to each of the configuration examples. In the figures such as FIG. 1, a reference character IMG denotes an image plane, and a reference character Z1 denotes an optical axis.

In the followings, a configuration of an imaging lens according to this embodiment is described in association with the configuration examples illustrated in the figures such as FIG 1 as appropriate. However, the technology according to the disclosure is not limited to the configuration examples as illustrated in the figures.

The imaging lens according to this embodiment includes a negative front group Gf, an aperture stop S, and a positive rear group Gr, in the order from object side to image side. The front group Gf includes a negative first lens L1, a negative second lens L2, and a positive third lens L3. The rear group Gr includes a positive fourth lens L4, a negative fifth lens L5, and a positive sixth lens L6. That is, the imaging lens according to this embodiment includes substantially six lenses.

In addition, it is preferable that the imaging lens according to this embodiment further satisfy, for example, predetermined conditional expressions as described later.

[2. Workings and Effects]

Description is given next on workings and effects of the imaging lens according to this embodiment. Described together are preferable configurations in the imaging lens according to this embodiment.

It is to be noted that effects described herein are merely exemplified. Effects of the technology are not limited to the effects described herein. Effects of the technology may further include other effects than the effects described herein.

According to the imaging lens of this embodiment, with a configuration of six single lenses as a whole, it is possible to obtain satisfactory optical characteristics with the small number of lenses, while downsizing and restraining costs. Moreover, as described below, optimization of a configuration of each lens is attained, mainly by lens shapes and power distribution. This makes it possible to achieve size reduction and cost reduction while providing a wide field angle and high image quality. Moreover, as described below, the optimization of the configuration of each lens is attained, mainly by the lens materials and the power distribution. This makes it possible to restrain changes in the optical characteristics due to temperature changes at low costs.

In the imaging lens according to this embodiment in order to achieve the size reduction and the cost reduction while providing the wide field angle and the high image quality, it is preferable that the first lens L1 have a meniscus shape with a convex surface facing the object side. It is preferable that the second lens L2 have the meniscus shape with a convex surface facing the object side. It is preferable that the third lens L3 have a biconvex shape. It is preferable that the fifth lens L5 include a concave surface facing the image side. It is preferable that the sixth lens L6 include a concave surface lacing the image side.

Furthermore, it is preferable that at least one of the following conditional expressions (1) to (3) be satisfied, $$-12<f1/f<-5 \quad (1)$$

$$R2l/f>3.3 \quad (2)$$

$$1.0<(R3+R4)/(R3-R4)<1.6 \quad (3)$$

where
- f1: a focal length of the first lens L1
- f: a focal length of a lens entire system
- R2: a radius of curvature of a surface on the image side of the first lens L1
- R3: a radius of curvature of the surface on the object side of the second lens L2
- R4: a radius of curvature of a surface on the image side of the second lens L2

The conditional expression (1) as mentioned above is an expression that represents a condition that provides a configuration suitable for a balance between the wide field angle and the size reduction of the first lens L1. Falling below a lower limit of the conditional expression (1) causes refractive power of the first lens L1 to be lowered. This causes difficulty in providing the wide field angle, and causes an increase in a diameter of the first lens L1. In contrast, exceeding an upper limit of the conditional expression (1) causes the refractive power of the first lens L1 to become too strong. This cause difficulty in correcting an off-axis aberration. Accordingly, allowing the imaging to satisfy the conditional expression (1) allows for appropriate regulation of allocation of the refractive power of the first lens L1, leading to the balance between the wide field angle and the size reduction.

The conditional expression (2) as mentioned above is an expression that regulates the radius of curvature of the surface on the image side of the first lens L1. Falling below a lower limit of the conditional expression (2) causes refractive power of the surface on the image side of the first lens L1 to become too strong. This causes occurrence of the off-axis aberration, while causing difficulty in processing of the surface on the image side, resulting in an increase in manufacture costs. Accordingly, allowing the imaging lens to satisfy the conditional expression (2) allows for rationalization of the refractive power of the surface on the image side of the first lens L1, making it possible to restrain the manufacture costs.

The conditional expression (3) as mentioned above is an expression that regulates the radius of curvature of the second lens L2. Falling below a lower limit of the conditional expression (3) causes the second lens L2 to become a biconcave lens with a concave surface facing the object side, and to have large refractive power. This causes degradation in optical performance due to lens eccentricity caused by variations in manufacture. In contrast, exceeding an upper limit of the conditional expression (3) causes the radii of curvature of the surface on the object side and the surface on the image side of the second lens L2 to be too close. This causes refractive power of the second lens L2 to be lowered, causing difficulty in achieving the wide field angle. Accordingly, allowing the imaging lens to satisfy the conditional expression (3) allows for rationalization of the refractive power of the second lens L2, making it possible to achieve the wide field angle and reduction in sensitivity to eccentricity.

It is to be noted that it is more preferable to limit the upper limits and the lower limits of the conditional expressions (1), (2), and (3) as follows.

$$-10<f1/f<-6 \quad (1a)$$

$$R2/f>3.5 \quad (2a)$$

$$1.1<(R3+R4)/(R3-R4)<1.5 \quad (3a)$$

Moreover, in the imaging lens according to this embodiment, it is preferable that Abbe numbers with respect to d line of the first lens L1, the second lens L2, the fourth lens L4, and the sixth lens L6 are equal to or larger than 40, and that the Abbe numbers of the third lens L3 and the fifth lens L5 are equal to or smaller than 28. Satisfying the conditions as mentioned above makes it possible to satisfactorily correct a chromatic aberration.

In the imaging lens according to this embodiment in order to restrain the changes in the optical characteristics due to the temperature changes at low costs, it is preferable that the first lens L1 and the sixth lens L6 be made of glass. Moreover, it is preferable that each of the second lens to the fifth lens be made of plastics.

Out of the first lens L1 to the sixth lens L6, the sixth lens L6 is the closest to the imaging element 101. Glass has smaller changes in characteristics in accordance with the temperature, than plastics have. Allowing the sixth lens L6 to be made of glass makes it possible to restrain the optical characteristics from being affected by a temperature rise due to heat generation of the imaging element 101. Moreover, allowing the first lens L1 that is exposed to outside air to be made of glass makes it possible to enhance environment resistance. Furthermore, allowing both the negative first lens L1 and the positive sixth lens L6 to be glass lenses allows for mutual cancellation of the changes in the optical characteristics due to the temperature characteristics. This makes it possible to reduce the changes in the optical characteristics as a whole.

In order to restrain the changes in the optical characteristics due to the temperature changes, furthermore, if is preferable that at least one of the following conditional expressions (4) to (6) be satisfied in particular, in order to restrain changes in focal positions accompanying the temperature changes, it is preferable that the conditional expressions (4) and (5) be satisfied. Moreover, in order to restrain changes in a field angle accompanying the temperature changes, it is preferable that the conditional expression be satisfied.

$$|fi/f|>1.3 \quad (4)$$

$$20<|fp| \quad (5)$$

$$4<f56/f<9 \quad (6)$$

where
- fi: a focal length, of the i-th lens (i=1 to 6) (a focal length of each of the first lens to the sixth lens)
- fp: a composite focal length of the second to the fifth lenses L2 to L5
- f56: a composite focal length of the fifth lens L5 and the sixth lens L6

The conditional expression (4) mentioned above is an expression that regulates a ratio of refractive power of each lens to refractive power of the lens entire system. Falling below a lower limit of the conditional expression (4) causes an increase in the refractive power of each lens, and causes higher sensitivity to the eccentricity. Moreover, there occur larger changes in the refractive power due to the temperature changes, in particular in plastic lenses having larger changes in linear expansion coefficient values and refractive indexes due to the temperature changes than glass has. Accordingly, caused are the changes in the focal positions, and the degradation in the optical characteristics such as resolution performance.

The conditional expression (5) as mentioned above is an expression that regulates composite refractive power of the second lens L2 to the fifth lens L5 that are constituted by plastic lenses. Falling below a lower limit of the conditional expression (5) causes the composite refractive power to be strong. This causes an increase in changes in the refractive power due to the temperature changes, resulting in the degradation in the optical characteristics such as the changes in the focal positions.

The conditional expression (6) as mentioned above is an expression that represents a condition that reduces an angle of a light ray that enters the imaging element 101, and reduces changes in the field angle in a case where the focal position is shifted due to the temperature changes. Exceeding an upper limit or falling below a lower limit of the conditional expression (6) causes the angle of the light ray that enters the imaging element 101 to be steep (causes an angle of a light ray with respect to an imaging plane to be small). This causes the changes in the field angle on occasions of the temperature changes.

Moreover, it is more preferable that the upper limits and the lower limits of the conditional expressions (4) to (6) be limited as follows, $$|fi/f|>1.4 \quad (4a)$$

$$50<|fp| \quad (5a)$$

$$5<f56/f<8 \quad (6a)$$

Moreover, in a case with use of a member such as plastics having large linear expansion coefficients, instead of metals, for a lens holder member, expansion and contraction occur due to temperature changes of the holder member. Accordingly, it is more preferable that the conditional expression (5) be limited as follows, $$50<fp \quad (5b)$$

[3. Application Example to Imaging Unit]

The imaging lens according to this embodiment is applicable to, for example, an imaging unit such as an on-vehicle camera, a monitoring camera, and a camera for a mobile device. In the case of the application to the imaging unit, as illustrated in FIG. 1, the imaging element 101 such as CCD (Charge Coupled Devices) and CMOS (Complementary Metal Oxide Semiconductor) is disposed in the vicinity of the image plane IMG of the imaging lens. The imaging element 101 outputs an imaging signal (an image signal) that corresponds to an optical image formed by the imaging lens. In this case, as illustrated in the figures such as FIG. 1, for example, a filter such as an infrared ray cutoff filter and a low pass filter may be disposed between the sixth lens L6 to and the image plane IMG. In addition, optical members such as sealing glass for protection of the imaging element may be disposed.

FIGS. 11 and 12 provide a configuration example of on-vehicle cameras, as an application example to the imaging unit. FIG. 11 illustrates one example of exemplary disposition of the on-vehicle cameras. FIG. 12 illustrates one network configuration example of the on-vehicle cameras.

For example, as illustrated in FIG. 11, disposed are an on-vehicle camera 401 in front (forward) of a vehicle 301, on-vehicle cameras 402 and 403 on the right and on the left, and, furthermore, an on-vehicle camera 404 in the rear (rearward). The on-vehicle cameras 401 to 404 are coupled to an in-vehicle network 410, as illustrated in FIG. 12. To the in-vehicle network 410, also coupled are an ECU (Electrical Control Unit) 302, a display 414, and a speaker 415. The constituent blocks are each able to communicate mutually through the in-vehicle network 410.

An angle of image acquisition of the on-vehicle camera 401 provided in front of the vehicle 301 is, for example, in a range denoted by "a" in FIG. 11. An angle of image acquisition of the on-vehicle camera 402 is, for example, in a range denoted by "b" in FIG. 11. An angle of image acquisition of the on-vehicle camera 403 is, for example, in a range denoted by "c" in FIG. 11. An angle of image acquisition of the on-vehicle camera 404 is, for example, in a range denoted by "d" in FIG. 11. The on-vehicle cameras 401 to 404 each output images acquired, to the ECU 302. As a result, the ECU 302 is able to acquire an image around 360 degrees (omnidirectionally), i.e., frontward, rightward, leftward, and rearward of the vehicle 301.

The ECU 302 includes a signal processor 413, as illustrated in FIG. 12. The on-vehicle camera 401 includes a camera module 411 and a signal processor 412, as illustrated in FIG. 12. The signal processors 412 and 413 are each constituted by an LSI (Large Scale Integration), e.g., an image processor LSI. The camera module 411 includes an imaging lens 100 and an imaging element 100. To the imaging lens 100, the imaging lens according to this embodiment as illustrated in the figures such as FIG. 1 is applicable. The other on-vehicle cameras 402, 403, and 404 may have substantially similar configurations.

The signal processor 412 of the on-vehicle camera 401 converts a signal from the imaging element 101 to a signal in a form transmittable as the image signal to the in-vehicle network 410. The signal processor 412 transmits the signal converted, to the signal processor 413 of the ECU 302. The other on-vehicle cameras 402, 403, and 404 perform substantially similar processing.

The signal processor 413 of the ECU 302 receives the images from the plurality of on-vehicle cameras 401 to 404, composites the images, generates a high-field-angle image (a panorama image), and sends the image to the display 414. The display 414 displays the image thus sent.

Each of the signal processors 412 of the on-vehicle cameras 401 to 404 may also have a function of receiving a signal from the camera module 411, and making a detection of an object in the image (e.g., a vehicle, a person, a bicycle, and an obstacle ahead) with use of the image signal received. The signal processor 412 may also have a function of performing signal processing such as measurement of a distance to the object, and generation of a warning signal on the basis of the distance to the object. A result of the signal processing and the image signal in this case are transmitted, through the in-vehicle network 410, to the signal processor 413 of the ECU 302, the display 41, and the speaker 415.

The signal processor 413 of the ECU 302 may generate a signal for a brake control of the vehicle, or generate a signal for a speed control, as necessary, on the basis of the result of the signal processing in each of the signal processors 412 of the on-vehicle cameras 401 to 404. Moreover, on receiving the warning signal, the display 41 displays a warning image, to give a warning to a driver. Furthermore, on receiving the warning signal, the speaker 415 provides a warning sound, to give the warning to the driver.

EXAMPLES

[4. Numerical Example of Lens]

Description is given next on specific Numerical Examples of the imaging lens according to this embodiment. Here, described are Numerical Examples in winch specific numerical values are applied to the imaging lenses 1, 2, 3, 4, and 5 of the respective configuration examples as illustrated in FIGS. 1, 3, 5, 7, and 9.

It is to be noted that meanings of symbols and other legends illustrated in the following tables and description are as follows. The term "surface number" stands for the number of the i-th surface counted from the object side toward the image side. The term "Ri" stands for a value (mm) of a paraxial radius of curvature of the i-th surface. The term "Di" stands for a value (mm) of an axial surface interval (a lens center thickness, or an air interval) between the i-th surface and the (i+1)-th surface. The term "Ni" stands for a value of a refractive index at the d line (wavelength 587.6 nm) of, for example, a lens starting at the i-th surface. The term "vi" stands for a value of the Abbe number at the d line of, for example, the lens starting at the i-th surface. A part whose value of "Ri" is "∞" stands for a flat plane, or a stop plane (the aperture stop S). A surface represented as "STO" in the "surface number" means that the surface is the aperture stop S. The term "f" stands for the focal length of the lens entire system. The term "Fno" stands for an F number (maximum aperture). The term "ω" stands for a half field angle.

Some of the lenses used in each Numerical Example include an aspherically formed lens surface. A surface represented as "ASP" in the "surface number" means that the surface is an aspherical surface. An a spherical shape is defined by the following expression. It is to be noted that in each table described later that summarizes aspherical surface coefficients, the term "E–n" is exponential notation with base of 10. That is, the term "E–n" means "minus n-th power of 10". For example, "0.12345E–05" means "0.12345× (minus 5th power of 10)".

$$x = \frac{cy^2}{1 + \{1 - (1+\kappa)c^2 y^2\}} + A_4 y^4 + A_6 y^6 + A_8 y^8 + A_{10} y^{10} + A_{12} y^{12} + A_{14} y^{14} + A_{16} y^{16}$$

In the expression of the aspherical surface as mentioned above, a distance in a direction of an optical axis from a vertex of a lens surface is denoted by "x". A height in a direction perpendicular to the optical axis is denoted by "y". A paraxial curvature (1/R) at a lens vertex is denoted by "c". A conical constant (a conic constant) is denoted by "κ". The terms "A4", "A6", "A8", "A10", "A12", "A14", and "A16" denote respectively the 4th, 6th, 8th, 10th, 12th, 14th, and 16th aspherical surface coefficients.

[Configuration Common to Numerical Examples]

All the imaging lenses 1 to 5 to which the following Numerical Examples are applied have configurations that satisfy the basic lens configuration as described above. All the imaging lenses 1 to 5 include the negative front group Gf, the aperture stop S, and the positive rear group Gr, in this order from the object side toward the image side. The front group Gf includes the negative first lens L1, the negative second lens L2, and the positive third lens L3. The rear group Gr includes the positive fourth lens L4, the negative fifth lens L5, and the positive sixth lens L6. In other words, all the imaging lenses 1 to 5 include substantially six lenses.

The first lens L1 has the meniscus shape with the convex surface facing the object side. The second lens L2 has the meniscus shape with the convex surface facing the object side. The third lens L3 has the biconvex shape. The fifth lens L5 includes the concave surface facing the image side. The sixth lens L6 includes the concave surface facing the image side.

The aperture stop S is disposed between the third lens L3 and the fourth lens L4. The filter FL is disposed between the sixth lens L6 and the image plane IMG.

Numerical Example 1

[Table 1] summarizes lens data of Numerical Example 1 in which specific numerical values are applied to the imaging lens 1 illustrated in FIG. 1. In the imaging lens 1, both sides of each of the second lens L2 to the sixth lens L6 are the aspherical surfaces. [Table 2] summarizes values of the aspherical surface coefficients A4, A6, A8, A10, A12, A14, and A16 in the aspherical surfaces, together with values of the conical coefficient κ. Moreover, [Table 3] summaries the focal length f of the entire system, the F number Fno, the half field angle ω, and a value of a lens total length.

In this Numerical Example 1, the first lens L1 is a glass lens. The second lens L2 to the sixth L6 are all plastic lenses.

TABLE 1

| Example 1 | | | | |
|---|---|---|---|---|
| Surface number | Ri | Di | Ni | vi |
| 1 | 14.600 | 1.300 | 1.58913 | 61.25 |
| 2 | 3.728 | 1.573 | | |
| 3(ASP) | 6.998 | 0.565 | 1.54442 | 56 |
| 4(ASP) | 1.009 | 1.542 | | |
| 5(ASP) | 22.268 | 1.900 | 1.64 | 23.5 |
| 6(ASP) | −3.454 | 0.090 | | |
| 7(STO) | ∞ | 0.650 | | |
| 8(ASP) | 3.319 | 1.253 | 1.54442 | 56 |
| 9(ASP) | −1.355 | 0.040 | | |
| 10(ASP) | −1.706 | 0.480 | 1.64 | 23.5 |
| 11(ASP) | 2.470 | 0.040 | | |
| 12(ASP) | 1.889 | 1.469 | 1.54442 | 56 |
| 13(ASP) | −2.540 | 0.172 | | |
| 14 | ∞ | 1.000 | 1.517 | 64.2 |
| 15 | ∞ | 1.06 | | |

TABLE 2

Example 1

| Surface number | κ | A4 | A6 | A8 |
|---|---|---|---|---|
| 3 | 4.3154E+00 | 1.1015E−02 | −4.6770E−03 | 5.0460E−04 |
| 4 | −1.0548E+00 | 1.1462E−01 | 3.2649E−02 | −2.5060E−03 |
| 5 | 1.0357E+00 | −9.0839E−03 | 1.4807E−02 | −1.9892E−02 |
| 6 | −4.2476E−01 | −1.2958E−02 | −1.8807E−02 | 6.6874E−02 |
| 8 | −3.9816E+00 | −5.6676E−03 | −2.3305E−02 | 2.4803E−02 |
| 9 | −5.7721E−01 | 1.2233E−02 | 5.4986E−03 | 4.3862E−03 |
| 10 | −1.4118E+00 | 1.4062E−02 | −6.0693E−02 | 3.6215E−02 |
| 11 | −9.9106E−01 | 4.1967E−03 | −3.7657E−02 | 3.3146E−02 |
| 12 | −5.0000E+00 | −1.6943E−02 | 3.8994E−03 | 2.1169E−03 |
| 13 | −3.7308E−01 | −2.7541E−02 | 9.2880E−03 | −2.9392E−03 |

| Surface number | A10 | A12 | A14 | A16 |
|---|---|---|---|---|
| 3 | −2.6017E−05 | 0.0000E+00 | 0.0000E+00 | 0.0000E+00 |
| 4 | −1.9729E−03 | 6.5523E−03 | −4.4618E−03 | 0.0000E+00 |
| 5 | 8.8515E−03 | −1.5370E−03 | −6.1087E−04 | 0.0000E+00 |
| 6 | −1.2507E−01 | 1.2949E−01 | −7.0636E−02 | 1.5776E−02 |
| 8 | −4.5051E−02 | 3.1194E−02 | −1.1190E−02 | 0.0000E+00 |
| 9 | −2.6441E−02 | 2.8888E−02 | −1.0875E−02 | 0.0000E+00 |
| 10 | −1.4884E−03 | −7.7638E−04 | 0.0000E+00 | 0.0000E+00 |
| 11 | −1.3882E−02 | 2.3377E−03 | 0.0000E+00 | 0.0000E+00 |
| 12 | −1.0773E−03 | 1.4682E−04 | 0.0000E+00 | 0.0000E+00 |
| 13 | 7.2335E−04 | 0.0000E+00 | 0.0000E+00 | 0.0000E+00 |

TABLE 3

Example 1

| | |
|---|---|
| Focal length (f) | 1.05 |
| F number (Fno) | 2.0 |
| Half field angle (ω) | 101 |
| Lens total length | 13.142 |

Various aberrations in Numerical Example 1 described above are illustrated in FIG. 2. FIG. 2 illustrates, as the various aberrations, a spherical aberration and astigmatism (field curvature) in a focusing state at a finite distance (400 mm). Each of the aberration diagrams illustrates the aberration with the d line (587.56 nm) serving as a reference wavelength. In the spherical aberration diagram, a solid line denotes the aberration with respect to the d line. An alternate long and short dash line denotes the aberration with respect to g line (435.84 nm). A broken line denotes the aberration with respect to the C line (656.27 nm). In the astigmatism diagram, a solid line denotes a value of the aberration in a sagittal image plane, and a broken line denotes a value of the aberration in a meridional image plane. The same applies to aberration diagrams in the following other Numerical Examples.

As seen from each, of the above-described aberration diagrams, it is evident that the imaging lens 1 is satisfactorily corrected in the various aberrations, and has optimal imaging performance.

Numerical Example 2

[Table 4] summarizes lens data of Numerical Example 2 in which specific numerical values are applied to the imaging lens 2 illustrated in FIG. 3. In the imaging lens 2, both sides of each of the second lens L2 to the sixth lens L6 are the aspherical surfaces. [Table 5] summarizes the values of the aspherical surface coefficients A4, A6, A8, A10, A12, A14, and A16 in the aspherical surfaces, together with the values of the conical coefficient κMoreover. [Table 6] summarizes the focal length f of the entire system, the F number Fno, the half field angle ω, and the value of the lens total length.

In this Numerical Example 2, the first lens L1 is a glass lens. Moreover, the second lens L2 to the sixth lens L6 are all plastic lenses.

TABLE 4

Example 1

| Surface number | Ri | Di | Ni | vi |
|---|---|---|---|---|
| 1 | 20.221 | 1.300 | 1.58913 | 61.25 |
| 2 | 4.049 | 1.384 | | |
| 3(ASP) | 4.423 | 0.676 | 1.54442 | 56 |
| 4(ASP) | 0.862 | 1.207 | | |
| 5(ASP) | 4.668 | 2.590 | 1.64 | 23.5 |
| 6(ASP) | −21.694 | 0.368 | | |
| 7(STO) | ∞ | 0.000 | | |
| 8(ASP) | 2.034 | 1.206 | 1.54442 | 56 |
| 9(ASP) | −1.834 | 0.147 | | |
| 10(ASP) | −2.872 | 0.719 | 1.64 | 23.5 |
| 11(ASP) | 2.375 | 0.115 | | |
| 12(ASP) | 2.769 | 1.291 | 1.54442 | 56 |
| 13(ASP) | −1.855 | 0.481 | | |
| 14 | ∞ | 1.000 | 1.517 | 64.2 |
| 15 | ∞ | 0.585 | | |

TABLE 5

Example 2

| Surface number | K | A4 | A6 | A8 |
|---|---|---|---|---|
| 3 | −6.3306E+00 | −1.1136E−02 | 6.5265E−04 | −7.2000E−06 |
| 4 | −1.0779E+00 | 1.6796E−02 | −2.6500E−03 | −1.1031E−03 |
| 5 | 7.8440E+01 | −3.7579E−03 | 2.7643E−03 | −1.5277E−03 |
| 6 | 0.0000E+00 | −2.7797E−02 | 1.6195E−02 | −5.8453E−03 |
| 8 | 1.6208E+00 | −5.2872E−02 | −6.6045E−03 | −2.0363E−02 |
| 9 | 0.0000E+00 | 8.3637E−02 | −8.1479E−02 | 1.8277E−02 |
| 10 | 2.1099E+00 | −3.5879E−03 | −4.2024E−02 | 1.5412E−02 |
| 11 | 2.9313E−01 | −8.5018E−02 | 3.4432E−02 | −1.1961E−02 |
| 12 | 7.5763E−02 | −5.0293E−02 | 2.0692E−02 | −5.6127E−03 |
| 13 | −5.4941E−01 | 4.1628E−02 | −5.5231E−03 | 6.0341E−03 |

| Surface number | A10 | A12 | A14 | A16 |
|---|---|---|---|---|
| 3 | 0.0000E+00 | 0.0000E+00 | 0.0000E+00 | 0.0000E+00 |
| 4 | 0.0000E+00 | 0.0000E+00 | 0.0000E+00 | 0.0000E+00 |
| 5 | 0.0000E+00 | 0.0000E+00 | 0.0000E+00 | 0.0000E+00 |
| 6 | 0.0000E+00 | 0.0000E+00 | 0.0000E+00 | 0.0000E+00 |
| 8 | −7.5433E−03 | 3.9646E−02 | 0.0000E+00 | 0.0000E+00 |
| 9 | 7.8184E−03 | 4.0147E−02 | 9.0603E−03 | 0.0000E+00 |
| 10 | −3.2887E−03 | 5.0217E−12 | 1.2598E−03 | 0.0000E+00 |
| 11 | 5.9759E−03 | −1.2393E−03 | 1.2936E−04 | 0.0000E+00 |
| 12 | 2.5511E−04 | 0.0000E+00 | 0.0000E+00 | 0.0000E+00 |
| 13 | −1.6882E−03 | 0.0000E+00 | 0.0000E+00 | 0.0000E+00 |

TABLE 6

Example 2

| | |
|---|---|
| Focal length (f) | 1.08 |
| F number (Fno) | 2.0 |
| Half field angle (ω) | 88 |
| Lens total length | 13.071 |

Various aberrations in Numerical Example 2 described above are illustrated in FIG. 4. As seen from each of the aberration diagrams, it is evident that the imaging lens 2 is satisfactorily corrected in the various aberrations, and has the optimal imaging performance.

Numerical Example 3

[Table 7] summarizes lens data of Numerical Example 3 in which specific numerical values are applied to the imaging lens 3 illustrated in FIG. 5. In the imaging lens 3, both sides of each of the second lens L2, and the fourth lens L4 to the sixth lens L6 are the aspherical surfaces. Moreover, the surface on the object side (the fifth surface) of the third lefts L3 is the aspherical surface, [Table 8] summarizes the values of the aspherical surface coefficients A4, A6, A8, A10, A12, A14, and A16 in the aspherical surfaces, together with the values of the corneal coefficient κ. Moreover, [Table 9] summarizes the focal length f of the entire system, the F number Fno, the half field angle ω, and the value of the lens total length.

In this Numerical Example 3, the first lens L1 and the fourth lens L4 are glass lenses. Moreover, the second lens L2 and the third lens L3, and the fifth lens L5 and the sixth lens L6 are plastic lenses.

TABLE 7

Example 3

| Surface number | Ri | Di | Ni | vi |
|---|---|---|---|---|
| 1 | 13.680 | 1.300 | 1.83481 | 42.72 |
| 2 | 3.900 | 2.546 | | |
| 3(ASP) | 8.700 | 0.550 | 1.54442 | 56 |
| 4(ASP) | 0.946 | 1.087 | | |
| 5(ASP) | 2.670 | 1.060 | 1.64 | 23.5 |
| 6 | −1000.000 | 0.564 | | |
| 7(STO) | ∞ | 0.647 | | |
| 8(ASP) | 2.840 | 1.155 | 1.59201 | 67.02 |
| 9(ASP) | −1.600 | 0.120 | | |
| 10(ASP) | −2.860 | 0.500 | 1.64 | 23.5 |
| 11(ASP) | 1.990 | 0.120 | | |
| 12(ASP) | 2.120 | 1.400 | 1.54442 | 56 |
| 13(ASP) | −2.370 | 0.576 | | |
| 14 | ∞ | 1.000 | 1.517 | 64.2 |
| 15 | ∞ | 0.574 | | |

TABLE 8

Example 3

| Surface number | κ | A4 | A6 | A8 |
|---|---|---|---|---|
| 3 | 0.0000E+00 | −1.4468E−02 | 8.8276E−04 | 0.0000E+00 |
| 4 | −6.7879E−01 | 2.2936E−03 | −6.4518E−03 | −1.2241E−02 |
| 5 | 0.0000E+00 | 1.0545E−02 | 1.2899E−03 | −2.5931E−03 |
| 8 | −4.7958E−01 | −2.7260E−02 | 2.2398E−02 | −1.4347E−01 |
| 9 | −6.6475E−01 | 2.8310E−02 | −3.5305E−03 | −1.4733E−02 |
| 10 | −4.9963E+00 | −6.0784E−02 | 2.8431E−02 | 2.8447E−02 |

TABLE 8-continued

| | Example 3 | | | |
|---|---|---|---|---|
| 11 | 0.0000E+00 | −1.0835E−01 | 6.8769E−02 | −2.7909E−02 |
| 12 | 0.0000E+00 | −8.2164E−02 | 3.1964E−02 | −9.6051E−03 |
| 13 | −4.8267E−01 | −2.3864E−03 | 4.5635E−03 | −1.9456E−03 |

| Surface number | A10 | A12 | A14 | A16 |
|---|---|---|---|---|
| 3 | 0.0000E+00 | 0.0000E+00 | 0.0000E+00 | 0.0000E+00 |
| 4 | 0.0000E+00 | 0.0000E+00 | 0.0000E+00 | 0.0000E+00 |
| 5 | 0.0000E+00 | 0.0000E+00 | 0.0000E+00 | 0.0000E+00 |
| 8 | 2.7760E−01 | −1.4355E−01 | −3.2999E−01 | 5.1015E−01 |
| 9 | 3.3111E−02 | −5.3233E−02 | 3.4154E−02 | −8.4532E−03 |
| 10 | −4.8647E−02 | 1.8756E−02 | 0.0000E+00 | 0.0000E+00 |
| 11 | 2.0276E−03 | 9.7902E−04 | 0.0000E+00 | 0.0000E+00 |
| 12 | 1.2564E−03 | 0.0000E+00 | 0.0000E+00 | 0.0000E+00 |
| 13 | 8.4436E−04 | 0.0000E+00 | 0.0000E+00 | 0.0000E+00 |

TABLE 9

| Example 3 | |
|---|---|
| Focal length (f) | 1.05 |
| F number (Fno) | 2.0 |
| Half field angle (ω) | 102 |
| Lens total length | 13.199 |

Various aberrations in Numerical Example 3 described above are illustrated in FIG. 6. As seen from each of the aberration diagrams, it is evident that the imaging lens 3 is satisfactorily corrected in the various aberrations, and has the optimal imaging performance.

Numerical Example 4

[Table 10] summarizes lens data of Numerical Example 4 in which specific numerical values are applied to the imaging lens 4 illustrated in FIG 7. In the imaging lens 4, both sides of each of the second lens L2 to the sixth lens L6 are the aspherical surfaces. [Table 11] summarizes the values of the aspherical surface coefficients A4, A6, A8, A10, A12, A14, and A16 in the aspherical surfaces, together with the values of the conical coefficient κ. Moreover, [Table 12] summarizes the focal length f of the entire system, the F number Fno, the half field angle ω, and the value of the lens total length.

In this Numerical Example 4, the first lens L1 and the sixth lens L6 are glass lenses. Moreover, the second lens L2 to the fifth lens L5 are all plastic lenses.

TABLE 10

| | Example 4 | | | |
|---|---|---|---|---|
| Surface number | Ri | Di | Ni | vi |
| 1 | 15.915 | 1.300 | 1.58913 | 61.25 |
| 2 | 3.497 | 2.173 | | |
| 3(ASP) | 7.875 | 0.550 | 1.54442 | 56 |
| 4(ASP) | 0.890 | 1.254 | | |
| 5(ASP) | 3.326 | 1.306 | 1.64 | 23.5 |
| 6(ASP) | −66.597 | 0.090 | | |
| 7(STO) | ∞ | 0.720 | | |
| 8(ASP) | 2.961 | 1.402 | 1.54442 | 56 |
| 9(ASP) | −1.545 | 0.040 | | |
| 10(ASP) | −1.804 | 0.450 | 1.64 | 23.5 |
| 11(ASP) | 7.338 | 0.050 | | |
| 12(ASP) | 2.766 | 1.905 | 1.59201 | 67.02 |
| 13(ASP) | −2.080 | 0.120 | | |
| 14 | ∞ | 1.000 | 1.517 | 64.2 |
| 15 | ∞ | 1.060 | | |

TABLE 11

| | Example 4 | | | |
|---|---|---|---|---|
| Surface number | κ | A4 | A6 | A8 |
| 3 | 6.8620E−00 | 8.2714E−03 | −6.5087E−03 | 8.7721E−04 |
| 4 | −3.4583E+00 | 5.0731E−01 | −3.6609E−01 | 3.0893E−01 |
| 5 | 2.1483E+00 | 3.2784E−02 | 5.8456E−02 | −7.1617E−02 |
| 6 | −1.5000E+01 | 5.0127E−02 | −9.6213E−02 | 5.8326E−01 |
| 8 | 1.0073E+00 | 1.2513E−02 | −5.2490E−02 | 6.7777E−02 |
| 9 | −3.2127E−01 | −6.2004E−02 | 7.7325E−02 | −3.5078E−02 |
| 10 | −3.9890E−02 | −5.7320E−02 | 8.9660E−02 | −4.1341E−02 |
| 11 | 5.1259E+00 | 1.6899E−02 | 1.0337E−02 | −7.1811E−03 |
| 12 | −2.6481E−01 | −2.0248E−02 | −8.1210E−04 | 1.0733E−03 |
| 13 | −5.3977E+00 | −3.9550E−02 | 1.4579E−02 | −4.2134E−03 |

TABLE 11-continued

| Example 4 | | | | |
|---|---|---|---|---|
| Surface number | A10 | A12 | A14 | A16 |
| 3 | −4.7806E−05 | 0.0000E+00 | 0.0000E+00 | 0.0000E+00 |
| 4 | −1.0788E−01 | 0.0000E+00 | 0.0000E+00 | 0.0000E+00 |
| 5 | 6.1450E−02 | −1.8807E−02 | −2.7135E−03 | 0.0000E+00 |
| 6 | −1.2699E+00 | 1.2755E+00 | −5.0689E−01 | 0.0000E+00 |
| 8 | −5.4449E−02 | 2.3411E−02 | −4.1237E−03 | 0.0000E+00 |
| 9 | 6.3490E−03 | 5.1933E−04 | 0.0000E+00 | 0.0000E+00 |
| 10 | 2.6675E−03 | 1.0593E−03 | 5.6973E−04 | 0.0000E+00 |
| 11 | 1.0443E−03 | 0.0000E+00 | 0.0000E+00 | 0.0000E+00 |
| 12 | −1.1344E−04 | 0.0000E+00 | 0.0000E+00 | 0.0000E+00 |
| 13 | 6.1635E−04 | 0.0000E+00 | 0.0000E+00 | 0.0000E+00 |

TABLE 12

| Example 4 | |
|---|---|
| Focal length (f) | 0.93 |
| F number (Fno) | 2.0 |
| Half field angle (ω) | 106 |
| Lens total length | 13.420 |

Various aberrations in Numerical Example 4 described above are illustrated in FIG. 8. As seen from each of the aberration diagrams, it is evident that the imaging lens 4 is satisfactorily corrected in the various aberrations, and has the optimal imaging performance.

Numerical Example 5

[Table 13] summarizes lens data of Numerical Example 5 in which specific numerical values are applied to the imaging lens 5 illustrated in FIG 9. In the imaging lens 5, both sides of each of the second lens L2 to the sixth lens L6 are the aspherical surfaces. [Table 14] summarizes the values of the aspherical surface coefficients A4, A6, A8, A10, A12, A14, and A16 in the aspherical surfaces, together with the values of the conical coefficient κ. Moreover, [Table 15] summarizes the focal length f of the entire system, the F number Fno, the half field angle ω, and the value of the lens total length.

In this Numerical Example 5, the first lens L1 and the sixth lens L6 are glass lenses. Moreover, the second lens L2 to the fifth lens L5 are all plastic lenses.

TABLE 13

| Example 5 | | | | |
|---|---|---|---|---|
| Surface number | Ri | Di | Ni | vi |
| 1 | 14.988 | 1.300 | 1.58913 | 61.25 |
| 2 | 3.703 | 2.035 | | |
| 3(ASP) | 11.160 | 0.550 | 1.54442 | 56 |
| 4(ASP) | 0.892 | 1.088 | | |
| 5(ASP) | 3.931 | 1.496 | 1.64 | 23.5 |
| 6(ASP) | −15.661 | 0.090 | | |
| 7(STO) | ∞ | 0.720 | | |
| 8(ASP) | 2.980 | 1.365 | 1.54442 | 56 |
| 9(ASP) | −1.414 | 0.040 | | |
| 10(ASP) | −1.696 | 0.227 | 1.64 | 23.5 |
| 11(ASP) | 6.995 | 0.050 | | |
| 12(ASP) | 2.735 | 1.900 | 1.59201 | 67.02 |
| 13(ASP) | −2.077 | 0.120 | | |
| 14 | ∞ | 1.000 | 1.517 | 64.2 |
| 15 | ∞ | 1.060 | | |

TABLE 14

| Example 5 | | | | |
|---|---|---|---|---|
| Surface number | κ | A4 | A6 | A8 |
| 3 | 1.7235E+01 | 1.2825E−02 | −6.6812E−03 | 8.6484E−04 |
| 4 | −3.7801E+00 | 5.4251E−01 | −4.1968E−01 | 3.6848E−01 |
| 5 | 1.2845E−01 | 2.0627E−02 | 6.8358E−02 | −8.2288E−02 |
| 6 | −1.5000E+00 | 3.2124E−02 | −1.3474E−01 | 7.1320E−01 |
| 8 | 1.0923E+00 | 1.3555E−02 | −5.3645E−02 | 6.8812E−02 |
| 9 | −5.0621E−01 | −4.1298E−02 | 8.2469E−02 | −3.2902E−02 |
| 10 | −2.6324E−01 | −4.7626E−02 | 9.8675E−02 | −3.9874E−02 |
| 11 | 2.6024E+00 | 1.4770E−02 | 1.1056E−02 | −6.3291E−03 |
| 12 | −5.0165E−01 | −2.6806E−02 | 1.4967E−03 | 7.0393E−04 |
| 13 | −5.4491E+00 | −4.6033E−02 | 1.7046E−02 | −4.7676E−03 |

| Surface number | A10 | A12 | A14 | A16 |
|---|---|---|---|---|
| 3 | −4.7806E−05 | 0.0000E+00 | 0.0000E+00 | 0.0000E+00 |
| 4 | −1.2861E−01 | 0.0000E+00 | 0.0000E+00 | 0.0000E+00 |
| 5 | 6.5588E−02 | −2.2190E−02 | −4.4455E−04 | 0.0000E+00 |
| 6 | −1.6853E+00 | 1.7132E+00 | −5.2320E−01 | 0.0000E+00 |
| 8 | −5.4846E−02 | 2.3555E−02 | −4.2088E−03 | 0.0000E+00 |
| 9 | 5.8960E−03 | −3.6927E−04 | 0.0000E+00 | 0.0000E+00 |
| 10 | 3.3151E−03 | 9.2287E−04 | −1.5923E−05 | 0.0000E+00 |

TABLE 14-continued

| | | Example 5 | | |
|---|---|---|---|---|
| 11 | 8.3607E−04 | 0.0000E+00 | 0.0000E+00 | 0.0000E+00 |
| 12 | −9.0448E−05 | 0.0000E+00 | 0.0000E+00 | 0.0000E+00 |
| 13 | 6.2889E−04 | 0.0000E+00 | 0.0000E+00 | 0.0000E+00 |

TABLE 15

| Example 5 | |
|---|---|
| Focal length (f) | 0.93 |
| F number (Fno) | 2.0 |
| Half field angle (ω) | 106 |
| Lens total length | 13.042 |

Various aberrations in Numerical Example 5 described above are illustrated in FIG. 10. As seen from each of the aberration diagrams, it is evident that the imaging lens 5 is satisfactorily corrected in the various aberrations, and has the optimal imaging performance.

[Other Numerical Data of Numerical Examples]

[Table 16] summarizes values regarding each of the conditional expressions as mentioned above, with respect to each of Numerical Examples. As is evident from [Table 16], the imaging lenses of all Examples satisfy the conditional expressions (1) to (4). The conditional expressions (5) and (6) are satisfied by at least the imaging lenses of Examples 4 and 5.

It is to be noted that regarding the conditional expression (4), summarized are values of fi/f (min). fi/f (min) represents a minimum value, out of values of the ratio (fi/f) of the focal length fi of the i-th lens (i=1 to 6) to the focal length f of the lens entire system.

TABLE 16

| Conditional expression | Example 1 | Example 2 | Example 3 | Example 4 | Example 5 |
|---|---|---|---|---|---|
| (1) f1/f | −8.44 | −8.18 | −6.59 | −8.52 | −9.39 |
| (2) R2/f | 3.55 | 3.76 | 3.71 | 3.78 | 4.00 |
| (3) (R2 + R3)/(R2 − R3) | 1.34 | 1.48 | 1.24 | 1.25 | 1.17 |
| (4) fi/f (min) | 1.42 | 1.771 | 1.66 | 2.38 | 2.26 |
| (5) \|fp\| | 33.21 | 9.541 | 18.12 | 50.10 | 98.86 |
| (6) f56/f | −36.79 | 7.816 | 23.41 | 6.03 | 7.35 |

[5. Other Embodiments]

The technology according to the disclosure is not limited to the description of the embodiment and Examples as mentioned above, and may be modified and implemented in a variety of ways.

For example, shapes and numerical values of each part as described in each of the forgoing Numerical Examples are merely examples of embodiments to carry out the technology, and the technical scope of the technology should never be restrictively interpreted on the basis of them.

Moreover, in the embodiment, and Examples as described above, description is given on the configuration that includes substantially six lenses. However, an alternative configuration may be possible that further includes a lens that is substantially devoid of refractive power.

Moreover, for example, the technology may have the following configurations.

[1]

An imaging lens, including a negative front group; a stop; and a positive rear group, the negative front group, the stop, and the positive rear group being disposed in order from object side toward image side, the front group including a negative first lens having a meniscus shape with a convex surface facing the object side, a negative second lens having the meniscus shape with a convex surface facing the object side, and a positive third lens having a biconvex shape, and the rear group including a positive fourth lens, a negative fifth lens with a concave surface feeing the image side, and a positive-sixth lens.

[2]

The imaging lens, according to [1], in which the imaging further satisfies the following condition, $$-12<f1/f<-5 \quad (1)$$

where f1 is a focal length of the first lens, and f is a focal length of a lens entire system.

[3]

The imaging lens according to [1] or [2], in which the imaging lens further satisfies the following condition, $$R2/f>3.3 \quad (2)$$

where R2 is a radius of curvature of a surface on the image side of the first lens

[4]

The imaging lens according to any one of [1] to [3], in which the imaging lens further satisfies the fallowing condition, $$1.0<(R3+R4)/(R3-R4)>1.6 \quad (3)$$

where R3 is a radius of curvature of the surface on the object side of the second lens, and R4 is a radius of curvature of a surface on the image side of the second lens.

[5]

The imaging lens according to any one of [1] to [4], in which the imaging lens further satisfies the following condition, $$|fi/f|>1.3 \quad (4)$$

where fi is a focal length of the i-th lens (i=1 to 6) (a focal length of each of the first lens to the sixth lens).

[6]

The imaging less according to [5], in which the first lens and the sixth lens are made of glass, and the imaging lens: satisfies the following condition, $$20<|fp| \quad (5)$$

where fp is a composite focal length of the second to the fifth lenses.

[7]

The imaging lens according to [5] or [6], in which each of the second to the fifth lenses is made of plastics.

[8]
The imaging lens according to any one of [5] to [7], in which the imaging lens further satisfies the following condition, $$4 < f56/f < 9 \tag{6}$$

where f56 is a composite focal length of the fifth lens and the sixth lens.

[9]
The imaging lens according to any one of [1] to [8], further including a lens that is substantially devoid of refractive power.

[10]
An imaging lens, including a negative front group; a stop; and a positive rear group, the negative front group, the stop, and the positive rear group being disposed in order from object side toward image side,
the front group including a negative first lens, a negative second lens, and a positive third lens,
the rear group including a positive fourth lens, a negative fifth lens, and a positive sixth lens,
the first lens and the sixth lens being made of glass, and
the imaging lens satisfying the following condition, $$20 < |fp| \tag{5}$$

where fp is a composite focal length of the second to the fifth lenses.

[11]
The imaging lens according to [10], in which
each of the second to the fifth lenses is made of plastics.

[12]
The imaging lens according to [10] or [11], in which the imaging lens further satisfies the following condition, $$|fi/f| > 1.3 \tag{4}$$

where fi is a focal length of the i-th lens (i=1 to 6) (a focal length of each of the first lens to the sixth lens).

[13]
The imaging lens according to any one of [10] to [12], in which the imaging lens further satisfies the following condition, $$-12 < f1/f < -5 \tag{1}$$

where f1 is a local length of the first lens, and f is a focal length of a lens entire system.

[14]
The imaging lens according to any one of [10] to [13], in which the imaging lens further satisfies the following condition, $$R2/f > 3.3 \tag{2}$$

where R2 is a radius of curvature of a surface on the image side of the first lens.

[15]
The imaging lens according to any one of [10] to [14], in which the imaging lens further satisfies the following condition, $$4 < f56/f > 9 \tag{6}$$

where f56 is a composite focal length of the fifth lens and the sixth lens.

[16]
The imaging lens according to any one of [10] to [15], further including a lens that is substantially devoid of refractive power.

[17]
An imaging unit provided with an imaging lens and an imaging element that outputs an imaging signal that corresponds to an optical image formed by the imaging lens,
the imaging lens including a negative front group; a stop; and a positive rear group, the negative front group, the stop, and the positive rear group being disposed in order from object side toward image side,
the front group including
a negative first lens having a meniscus shape with a convex surface facing the object side,
a negative second lens having the meniscus shape with a convex surface facing the object side, and
a positive third lens having a biconvex shape, and
the rear group including
a positive fourth lens,
a negative fifth lens with a concave surface facing the image side, and
a positive sixth lens.

[18]
The imaging unit according to [17], in which the imaging lens further includes a lens that is substantially devoid of refractive power.

[19]
An imaging unit provided with an imaging lens and an imaging element that outputs an imaging signal that corresponds to an optical image formed by the imaging lens,
the imaging lens including a negative front group; a stop; and a positive rear group, the negative front group, the stop, and the positive rear group being disposed in order from object side toward image side,
the front group including a negative first lens, a negative second lens, and a positive third lens,
the rear group including a positive fourth lens, a negative fifth lens, and a positive sixth lens,
the first lens raid the sixth lens being made of glass, and
the imaging lens satisfying the following condition, $$20 < |fp| \tag{5}$$

where fp is a composite focal length of the second to the fifth lenses.

[20]
The imaging unit according to [19], in which the imaging lens further includes a lens that is substantially devoid of refractive power, This application claims the benefit of Japanese Priority Patent Application JP2015-021994 filed on Feb. 6, 2015, the entire contents of which are incorporated herein by reference.

It should be understood by those skilled in the art that various modifications, combinations, subcombinations and alterations may occur depending on design requirements and other factors insofar as they are within the scope of the appended claims or the equivalents thereof.

The invention claimed is:

1. An imaging lens, comprising a negative front group; a stop; and a positive rear group, the negative front group, the stop, and the positive rear group being disposed in order from object side toward image side,
the front group including
a negative first lens having a meniscus shape with a convex surface facing the object side,
a negative second lens having the meniscus shape with a convex surface facing the object side, and a positive third lens having a biconvex shape, and the rear group including
a positive fourth lens,
a negative fifth lens with a concave surface facing the image side, and
a positive sixth lens, wherein the imaging lens further satisfies the following condition, $$1.0<(R3+R4)/(R3-R4)<1.6 \quad (3)$$

where R3 is a radius of curvature of the surface on the object side of the second lens, and R4 is a radius of curvature of a surface on the image side of the second lens.

2. The imaging lens according to claim 1, wherein the imaging lens further satisfies the following condition, $$-12<f1/f<-5 \quad (1)$$

where f1 is a focal length of the first lens, and f is a focal length of a lens entire system.

3. The imaging lens according to claim 1, wherein the imaging lens further satisfies the following condition, $$R2/f>3.3 \quad (2)$$

where R2 is a radius of curvature of a surface on the image side of the first lens.

4. The imaging lens according to claim 1, wherein the imaging lens further satisfies the following condition, $$|fi/f|>1.3 \quad (4)$$

where fi is a focal length of the i~th lens (i=1 to 6) (a focal length of each of the first lens to the sixth lens).

5. The imaging lens according to claim 4, wherein the first lens and the sixth lens are made of glass, and the imaging lens satisfies the following condition, $$20<|fp| \quad (5)$$

Where fp is a composite focal length of the second to the fifth lenses.

6. The imaging leas according to claim 5, wherein each of the second to the fifth lenses is made of plastics.

7. The imaging lens according to claim 5, wherein the imaging lens further satisfies the following condition, $$4<f56/f<9 \quad (6)$$

where f56 is a composite focal length of the fifth lens and the sixth lens.

8. An imaging lens, comprising a negative front group; a stop; and a positive rear group, the negative front group, the stop, and the positive rear group being disposed in order from object side toward image side,
the front group including a negative first lens, a negative second lens, and a positive third lens,
the rear group including a positive fourth lens, a negative fifth lens, and a positive sixth lens,
the first lens and the sixth lens being made of glass, and the imaging lens satisfying the following condition, $$20<|fp| \quad (5)$$

where fp is a composite focal length of the second to the fifth lenses, wherein each of the second to the fifth lenses is made of plastics.

9. The imaging lens according to claim 8, wherein the imaging lens further satisfies the following condition, $$|fi/f|>1.3 \quad (4)$$

Where fi is a focal length of the i~th lens (i=1 to 6) (a focal length of each of the first lens to the sixth lens).

10. The imaging lens according to claim 8, wherein the imaging lens further satisfies the following condition, $$-12<f1/f<-5 \quad (1)$$

Where f1 is a focal length of the first lens, and f is a focal length of a lens entire system.

11. The imaging lens according to claim 8, wherein the imaging lens further satisfies the following condition, $$R2/f>3.3 \quad (2)$$

where R2 is a radius of curvature of a surface on the image side of the first lens.

12. The imaging lens according to claim 8, wherein the imaging lens further satisfies the following condition, $$4<f56/f<9 \quad (6)$$

where f56 is a composite focal length of the fifth lens and the sixth lens.

13. An imaging unit provided with an imaging lens and an imaging element that outputs an imaging signal that corresponds to an optical image formed by the imaging lens,
the imaging lens comprising a negative front group; a stop; and a positive rear group, the negative front group, the stop, and the positive rear group being disposed in order from object side toward image side,
the front group including
a negative first lens having a meniscus shape with a convex surface facing the object side,
a negative second lens having the meniscus shape with a convex surface facing the object side, and
a positive third lens having a biconvex shape, and
the rear group including
a positive fourth lens,
a negative fifth lens with a concave surface facing the image side, and
a positive sixth lens, wherein the imaging lens further satisfies the following condition, $$1.0<(R3+R4)/(R3-R4)<1.6 \quad (3)$$

where R3 is a radius of curvature of the surface on the object side of the second lens, and R4 is a radius of curvature of a surface on the image side of the second lens.

14. An imaging unit provided with an imaging lens and an imaging element that outputs an imaging signal that corresponds to an optical image formed by the imaging lens,
the imaging lens comprising a negative front group; a stop; and a positive rear group, the negative front group, the stop, and the positive rear group being disposed in order from object side toward image side,
the front group including a negative first lens, a negative second lens, and a positive third lens
the rear group including a positive fourth lens, a negative fifth lens, and a positive sixth lens,
the first lens and the sixth lens being made of glass, and the imaging lens satisfying the following condition, $$20<|fp| \quad (5)$$

where fp is a composite focal length of the second to the fifth lenses, wherein each of the second to the fifth lenses is made of plastics.

* * * * *